(12) United States Patent
Lee et al.

(10) Patent No.: US 11,843,565 B2
(45) Date of Patent: Dec. 12, 2023

(54) DIALOGUE SYSTEM BASED ON CONTEXTUAL INFORMATION

(71) Applicant: International Business Machines Corporation, Armonk, NY (US)

(72) Inventors: Sunhwan Lee, San Mateo, CA (US); Saurabh Mishra, San Jose, CA (US)

(*) Notice: Subject to any disclaimer, the term of this patent is extended or adjusted under 35 U.S.C. 154(b) by 661 days.

(21) Appl. No.: 16/576,012

(22) Filed: Sep. 19, 2019

(65) Prior Publication Data
US 2021/0092078 A1    Mar. 25, 2021

(51) Int. Cl.
| H04L 51/02 | (2022.01) |
| G06N 20/00 | (2019.01) |
| G10L 15/18 | (2013.01) |
| G06F 16/687 | (2019.01) |
| G06F 16/635 | (2019.01) |
| G06F 16/683 | (2019.01) |

(52) U.S. Cl.
CPC ............ *H04L 51/02* (2013.01); *G06F 16/635* (2019.01); *G06F 16/685* (2019.01); *G06F 16/687* (2019.01); *G06N 20/00* (2019.01); *G10L 15/1815* (2013.01)

(58) Field of Classification Search
None
See application file for complete search history.

(56) References Cited

U.S. PATENT DOCUMENTS

| 9,369,410 | B2 | 6/2016 | Capper et al. | |
| 10,839,156 | B1* | 11/2020 | Saxena | G06F 40/30 |
| 2012/0016678 | A1* | 1/2012 | Gruber | G06F 40/279 |
| | | | | 704/E21.001 |
| 2013/0185081 | A1* | 7/2013 | Cheyer | G10L 15/183 |
| | | | | 704/275 |
| 2017/0324868 | A1* | 11/2017 | Tamblyn | H04M 7/0045 |
| 2018/0082184 | A1 | 3/2018 | Guo et al. | |
| 2018/0332169 | A1 | 11/2018 | Somech et al. | |
| 2019/0124020 | A1 | 4/2019 | Bobbarjung et al. | |
| 2020/0410012 | A1* | 12/2020 | Moon | G06N 3/084 |

OTHER PUBLICATIONS

Zhou, Li, et al., "The Design and Implementation of Xiaolce, an Empathetic Social Chatbot." arXiv preprint arXiv:1812.08989,2018, 26 pages.
Rogge, "Oracle Digital Assistant Version 18.4.3 Introduces Skill Chatbot Capability" Oracle: The Oracle Mobile & Digital Assistant Blog. Dec. 12, 2018.

(Continued)

*Primary Examiner* — Nafiz E Hoque

(57) ABSTRACT

Techniques that facilitate a dialogue system based on contextual information are provided. In one example, a system includes a contextual information component and a dialogue routing component. The contextual information component determines contextual information associated with a user identity based on a statement related to communication information received by a computing device associated with the user identity. The dialogue routing component generates a path traversal for a dialogue system based on the contextual information to facilitate generation of a response to the statement by the dialogue system.

17 Claims, 11 Drawing Sheets

(56) References Cited

OTHER PUBLICATIONS

James, "Chatbot Market Size to Reach $1.25 Billion by 2025: CAGR: 24.3%: Grand View Research, Inc." Press Release PR Newswire web accessed on Jun. 20, 2019 at https://markets.businessinsider.com/news/stocks/chatbot-market-size-to-reach-1-25-billion-by-2025-cagr-24-3-grand-view-research-inc-1002381903 (Sep. 19, 2017).

Mell, Peter, et al. "The NIST Definition of Cloud Computing." National Institute of Standards and Technology. Sep. 2011. 7 pages.

\* cited by examiner

DIALOGUE SYSTEM BASED ON CONTEXTUAL INFORMATION

BACKGROUND

The subject disclosure relates to dialogue systems, and more specifically, to artificial intelligence related to dialogue systems. A dialogue system (e.g., a conversational computing system, a chatbox system, a digital assistant, etc.) is a computer system that can employ artificial intelligence and/or natural language processing to facilitate human-computer interaction. A dialogue system generally handles a single task due to complexity of managing different tasks. Furthermore, a dialogue system generally relies on user statement input provided to the dialogue system and/or intent of user statement input to generate a response to a question provided to the dialogue system. In one example, Guo et al., U.S. Patent Publication No. 2018/0082184, discloses that "the question determination module 302 may be configured to analyze the question and determine a question type. Analyzing the question may refer to deriving the semantic meaning of that question (what the question is actually asking). The question determination module 302 may be configured to analyze the question through deriving how many parts or meanings are embedded in the question. Features of questions may be learned for a question-answer matching." However, relying on user statement input provided to the dialogue system and/or intent of user statement input to generate a response can, for example, lead to the user input being routed to an incorrect skill of the dialogue system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate a dialogue system based on contextual information are described.

According to an embodiment, a system can comprise a contextual information and a dialogue component. The contextual information component can determine contextual information associated with a user identity based on a statement related to communication information received by a computing device associated with the user identity. The dialogue routing component can generate a path traversal for a dialogue system based on the contextual information to facilitate generation of a response to the statement by the dialogue system. The system can provide various advantages as compared to conventional dialogue system techniques. In certain embodiments, the system can provide improved performance of routing input of a dialogue system to a corresponding skill of the dialogue system. In an embodiment, the dialogue routing component can generate a machine learning model associated with the path traversal for the dialogue system based on the contextual information. In another embodiment, the dialogue routing component can route information associated with the statement to a skill for the dialogue system based on the contextual information. In yet another embodiment, the contextual information component can determine intent information based on the statement. In certain embodiments, the dialogue routing component can generate the path traversal for the dialogue system based on the contextual information and the intent information. In yet another embodiment, the contextual information component can determine the contextual information based on location data indicative of a location associated with the computing device. In yet another embodiment, the contextual information component can determine the contextual information based on user profile data stored in the computing device. In yet another embodiment, the contextual information component can determines a first classification for the statement and a second classification for the contextual information. In certain embodiments, the system can comprise a communication component. In an embodiment, the communication component can obtain the statement based on audio data received by the computing device. In another embodiment, the communication component can obtain the statement based on textual data received by the computing device. In certain embodiments, the dialogue routing component can generate the path traversal for the dialogue system to improve performance of the dialogue system.

According to another embodiment, a computer-implemented method is provided. The computer-implemented method can comprise determining, by a system operatively coupled to a processor, contextual information associated with a user identity based on a statement related to communication information received by a computing device associated with the user identity. The computer-implemented method can also comprise generating, by the system, a path traversal for a dialogue system based on the contextual information to facilitate generation of a response to the statement by the dialogue system. The method can provide various advantages as compared to conventional dialogue system techniques. In certain embodiments, the method can provide improved performance of routing input of a dialogue system to a corresponding skill of the dialogue system. In an embodiment, the computer-implemented method can comprise generating, by the system, a machine learning model associated with the path traversal for the dialogue system based on the contextual information. In another embodiment, the computer-implemented method can comprise routing, by the system, information associated with the statement to a skill for the dialogue system based on the contextual information. In yet another embodiment, the computer-implemented method can comprise obtaining, by the system, the statement based on audio data received by the computing device or textual data received by the computing device. In certain embodiments, the generating the path traversal can comprise improving performance of the dialogue system.

According to yet another embodiment, a computer program product for improving a dialogue system can comprise a computer readable storage medium having program instructions embodied therewith. The program instructions can be executable by a processor and cause the processor to determine, by the processor, contextual information associated with a user identity based on a statement related to communication information received by a computing device associated with the user identity. The program instructions can also cause the processor to generate, by the processor, a path traversal for the dialogue system based on the contextual information to facilitate generation of a response to the statement by the dialogue system. The computer program product can provide various advantages as compared to conventional dialogue system techniques. In certain embodiments, the computer program product can provide improved performance of routing input of a dialogue system to a corresponding skill of the dialogue system. In an embodiment, the program instructions can also cause the processor to generate, by the processor, a machine learning model associated with the path traversal for the dialogue system based on the contextual information. In another embodiment, the program instructions can also cause the processor to route, by the processor, information associated with the statement to a skill for the dialogue system based on the contextual information. In yet another embodiment, the program instructions can also cause the processor to obtain, by the processor, the statement based on audio data received by the computing device or textual data received by the computing device.

DETAILED DESCRIPTION

Figure 1:
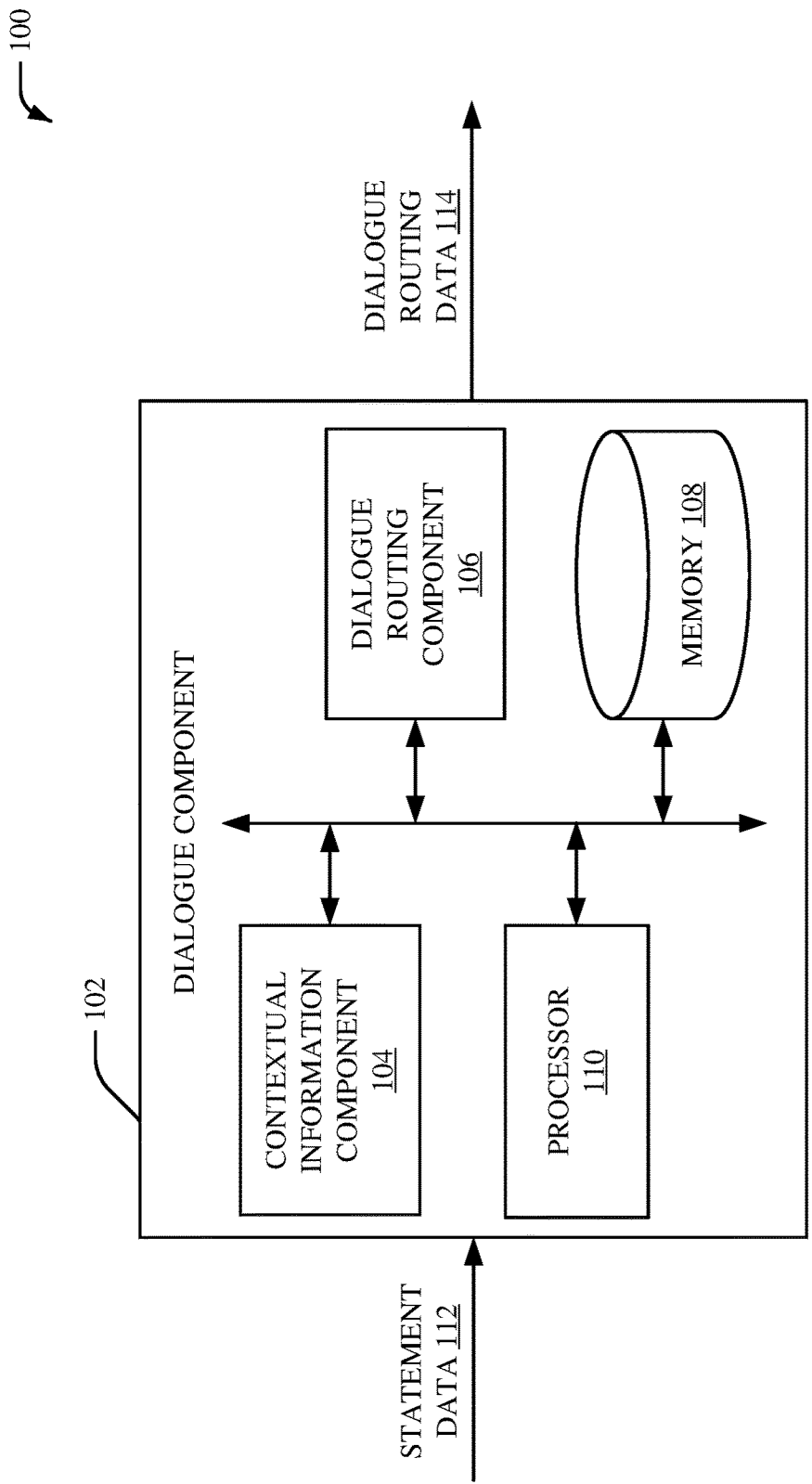
FIG. 1 illustrates a block diagram of an example, non-limiting system that includes a dialogue component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In this regard, a dialogue system (e.g., a conversational computing system, a chatbox system, a digital assistant, etc.) is a computer system that can employ artificial intelligence (AI) and/or natural language processing (NLP) to facilitate human-computer interaction. A dialogue system generally handles a single task due to complexity of managing different tasks. Furthermore, a dialogue system generally relies on user statement input provided to the dialogue system and/or intent of user statement input to generate a response to a question provided to the dialogue system. However, relying on user statement input provided to the dialogue system and/or intent of user statement input to generate a response can, for example, lead to the user input being routed to an incorrect skill of the dialogue system. As disclosed herein, a "skill" can be, for example, a model (e.g., a machine learning model, a generative model, etc.) that generates a response (e.g., an answer) in response to the user statement input provided to the dialogue system. As such, a dialogue system and/or dialogue skill routing associated with a dialogue system can be improved.

To address these and/or other issues associated with conventional dialogue systems, embodiments described herein include systems, computer-implemented methods, and computer program products for providing a dialogue system based on contextual information. For example, contextual information can be employed to improve performance of dialogue skill routing of user statement input to a corresponding skill of the dialogue system. In an embodiment, a dialogue system can be modeled and/or configured with multiple skills. The dialogue system can also employ a dialogue skill routing process. The dialogue skill routing process can employ an intent of a user input statement provided to the dialogue system and/or contextual information of the user input statement. For instance, contextual information associated with the user input statement can be extracted. In certain embodiments, the contextual information can be extracted by a language model such as, for example, a NLP model, a Natural Language Understanding (NLU) model and/or another type of language model. Additionally or alternatively, the contextual information can be extracted based on other non-textual data related with a user (e.g., a user identity) associated with the user input statement. The contextual information associated with the language model can include an entity such as, for example, a location, a name of a place, a date, a time, a noun, a verb, a feature and/or another entity. The contextual information associated with the other non-textual data can include an entity such as, for example, a user location, a user profile, and/or other data associated with a user. In an aspect, a model can be generated to route the user input statement to a corresponding skill associated with the dialogue system. In certain embodiments, a classification model can be generated to infer a correct skill for the user input statement to be routed via the dialogue system. As such, an improved dialogue system can be provided. For example, performance for routing input of a dialogue system to a corresponding skill of the dialogue system can be improved. Accuracy and/or quality of a response provided by a dialogue system can also be improved. Moreover, accuracy of data generated by a machine learning model for dialogue routing can be improved and/or quality of data generated by a machine learning model for dialogue routing can be improved.

FIG. 1 illustrates a block diagram of an example, non-limiting system 100 that facilitates a dialogue system based on contextual information in accordance with one or more embodiments described herein. In various embodiments, the system 100 can be a system associated with technologies such as, but not limited to, dialogue system technologies, human-computer dialogue system technologies, human-computer dialogue management technologies, conversational computing system technologies, chatbox system technologies, digital assistant technologies, digital concierge technologies, cloud computing technologies, mobile enterprise technologies, natural language processing technologies, natural language understanding technologies, artificial intelligence technologies, machine learning technologies, computer technologies, server technologies, server/client technologies, internet technology technologies, information technologies, digital technologies, data processing technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a dialogue component, etc.) for carrying out defined tasks related to machine learning, dialogue systems, dialogue routing and/or one or more other technologies. The system 100 and/or components of the system can be employed to solve new problems that arise through advancements in technologies mentioned above, and/or computer architecture, and the like. One or more embodiments of the system 100 can provide technical improvements to dialogue systems, human-computer dialogue systems, human-computer dialogue management systems, conversational computing systems, chatbox systems, digital assistant systems, digital concierge systems, cloud computing systems, mobile enterprise systems, natural language processing systems, natural language understanding systems, artificial intelligence systems, machine learning systems, computer systems, server systems, server/client systems, internet technology systems, information systems, digital systems, data processing systems, and/or other computer systems. One or more embodiments of the system 100 can also provide technical improvements to a processing unit (e.g., a processor) associated with a dialogue skill routing process by improving processing performance of the processing unit, improving processing efficiency of the processing unit, and/or reducing an amount of time for the processing unit to perform a dialogue skill routing process.

In the embodiment shown in FIG. 1, the system 100 can include a dialogue component 102. As shown in FIG. 1, the dialogue component 102 can include a contextual information component 104 and a dialogue routing component 106. Aspects of the dialogue component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the dialogue component 102 can also include memory 108 that stores computer executable components and instructions. Furthermore, the dialogue component 102 can include a processor 110 to facilitate execution of the instructions (e.g., computer executable components and corresponding instructions) by the dialogue component 102. As shown, the contextual information component 104, the dialogue routing component 106, the memory 108 and/or the processor 110 can be electrically and/or communicatively coupled to one another in one or more embodiments. In certain embodiments, the dialogue component 102 can be implemented on and/or in connection with a dialogue system.

The dialogue component 102 (e.g., the contextual information component 104 of the dialogue component 102) can receive statement data 112. The statement data 112 can include one or more statements associated with a user identity. In an aspect, the statement data 112 can be provided by a computing device. For example, a user can employ a computing device to generate the statement data 112. In another aspect, the statement data 112 can be related to communication information. For instance, the statement data 112 can be provided via one or more communications generated by a computing device. In yet another aspect, the statement data 112 can include audio data generated by a computing device and/or textual data generated by a computing device. For example, a user can employ a computing device to provide one or more statements of the statement data 112 via user input (e.g., user utterance) formatted as audio data and/or textual data. The audio data can include, for example, speech data (e.g., voice data), auditory data, video data, conversation data, and/or other non-textual data. The textual data can include, for example, input data, typed data, message data, conversation data and/or other textual data. A computing device can be, for example, a user device, an electronic device, a display device, a desktop computer, a laptop computer, a smart device, a smart phone, a mobile device, a handheld device, a tablet device, a virtual reality device, a portable computing device, or another computing device associated with a display.

The contextual information component 104 can determine (e.g., extract) contextual information (e.g., contextual data) associated with the statement data 112. The contextual information can be data that provides context to the statement data 112. In an aspect, the contextual information can provide knowledge regarding the statement data 112. In an embodiment, the contextual information component 104 can determine contextual information associated with a user identity based on the statement data 112. For instance, the contextual information can include an entity, a feature, an event, a preference, a noun, a verb, a location, a name of a place, a date, a time, and/or other contextual information. In certain embodiments, the contextual information component 104 can determine the contextual information associated with the statement data 112 via one or more NLP techniques and/or one or more NLU techniques. For example, the contextual information component 104 can employ a language model associated with NLP and/or a language model associated with NLP to extract the contextual information from the statement data 112. Additionally or alternatively, the contextual information component 104 can determine the contextual information based on non-textual data related to a user identity that provides the statement data 112. The non-textual data can include, for example, a user location associated with the user identity, a location associated with the computing device, a user profile associated with the user identity, historical data associated with the user identity and/or other non-textual data not included in the statement data 112. In an example, the contextual information component 104 can determine the contextual information based on location data indicative of a location associated with a computing device that provides the statement data 112. Additionally or alternatively, the contextual information component 104 can determine the contextual information based on user profile data stored in the computing device that provides the statement data 112.

In an embodiment, the contextual information component 104 can additionally or alternatively determine intent information (e.g., intent data) associated with the statement data 112. The intent information can be indicative of one or more intents associated with the statement data 112. For instance, the intent information can be indicative of a classification for one or more intents in the one or more statements associated with the statement data 112. In certain embodiments, the contextual information component 104 can determine the intent information associated with the statement data 112 based on one or more machine learning techniques. For example, the contextual information component 104 can determine the intent information associated with the statement data 112 based on one or more machine learning algorithms and/or one or more deep learning. Additionally or alternatively, in certain embodiments, the contextual information component 104 can determine the intent information associated with the statement data 112 based on one or more pattern matching techniques. For instance, the contextual information component 104 can identify one or more patterns in the statement data 112 to determine the intent information associated with the statement data 112. In certain embodiments, the contextual information component 104 can determine a first classification for the statement data 112 and a second classification for the contextual information. For example, the contextual information can be associated with a different classification than data (e.g., a phrase) included in the statement data 112.

The dialogue routing component 106 can generate a path traversal for a dialogue system to facilitate generation of a response to the statement data 112 by the dialogue system. For example, the dialogue routing component 106 can generate a path traversal for a dialogue system to facilitate generation of a response to one or more statements included in the statement data 112. The dialogue system can be a human-computer dialogue system, a human-computer dialogue management system, a conversational computing system, a chatbox system, a digital assistant system, a digital concierge system, and/or another type of dialogue system to facilitate a human-computer interaction (e.g., a human-computer conversation). In certain embodiments, the dialogue system can receive the statement data 112. The dialogue routing component 106 can generate the path traversal based on the contextual information. Additionally or alternatively, the dialogue routing component 106 can generate the path traversal based on the intent information. The path traversal can be a path along a dialogue skill route to route the statement data 112 to a skill associated with the dialogue system. For example, the statement data 112 can be directed along the path to provide an optimal path traversal to a skill associated with the dialogue system. A skill associated with the dialogue system can be, for example, a model (e.g., a machine learning model, a generative model, etc.) that generates a response (e.g., an answer) in response to the statement data 112. In an aspect, the dialogue routing component 106 can generate dialogue routing data 114 that includes at least the path traversal for the statement data 112. In certain embodiments, the dialogue routing component 106 can generate a machine learning model associated with the path traversal based on the contextual information and/or the intent information. Furthermore, the dialogue routing data 114 can additionally or alternatively include the machine learning model associated with the path traversal. In certain embodiments, the dialogue routing component 106 can route information associated with the statement data 112 to a skill for the dialogue system based on the contextual information and/or the intent information. For instance, the dialogue routing component 106 can route information associated with the statement data 112 to a skill for the dialogue system based on the dialogue routing data (e.g., the path traversal and/or the machine learning model associated with the path traversal). As such, the dialogue system can employ the contextual information and/or the intent information associated with the statement data 112 to generate a response to a phrase associated with the statement data 112. For example, the dialogue system can employ the contextual information and/or the intent information associated with the statement data 112 to generate a response to a question associated with the statement data 112.

It is to be appreciated that the dialogue component 102 (e.g., the contextual information component 104 and/or the dialogue routing component 106) performs a dialogue skill routing process and/or a machine learning process that cannot be performed by a human (e.g., is greater than the capability of a single human mind). For example, an amount of data processed, a speed of processing of data and/or data types processed by dialogue component 102 (e.g., the contextual information component 104 and/or the dialogue routing component 106) over a certain period of time can be greater, faster and different than an amount, speed and data type that can be processed by a single human mind over the same period of time. The dialogue component 102 (e.g., the contextual information component 104 and/or the dialogue routing component 106) can also be fully operational towards performing one or more other functions (e.g., fully powered on, fully executed, etc.) while also performing the above-referenced dialogue skill routing process and/or a machine learning process. Moreover, the dialogue routing data 114 generated by the dialogue component 102 (e.g., the contextual information component 104 and/or the dialogue routing component 106) can include information that is impossible to obtain manually by a user. For example, a type of information included in the dialogue routing data 114 can be more complex than information obtained manually by a user.

Additionally, it is to be appreciated that the system 100 can provide various advantages as compared to conventional dialogue system techniques. The system 100 can also provide various solutions to problems associated with conventional dialogue system techniques. For instance, performance for routing the statement data 112 to a corresponding skill of a dialogue system can be improved by employing the system 100. Furthermore, accuracy of data generated by a machine learning model associated with the dialogue routing data 114 can be improved. Moreover, quality of data generated by a machine learning model associated with the dialogue routing data 114 can be improved by employing the system 100.

Figure 2:
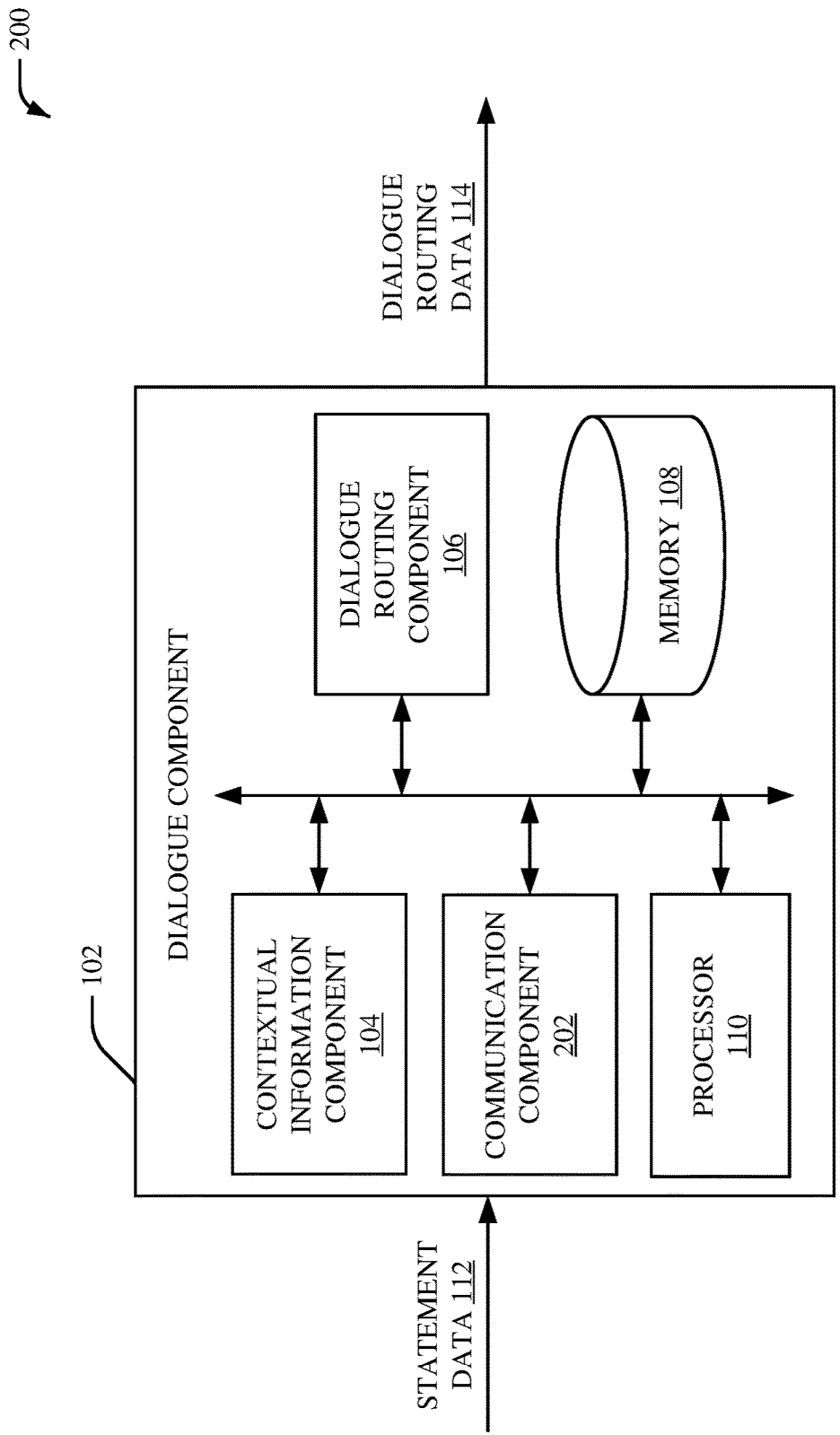
FIG. 2 illustrates a block diagram of another example, non-limiting system that includes a dialogue component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the dialogue component 102. The dialogue component 102 can include the contextual information component 104, the dialogue routing component 106, a communication component 202, the memory 108 and/or the processor 110. The communication component 202 can facilitate obtaining the statement data 112. Additionally or alternatively, the communication component 202 can facilitate transmission of a response associated with the statement data 112. In an embodiment, the communication component 202 can obtain the statement data 112 from a computing device. The computing device can be a user device, an electronic device, a display device, a desktop computer, a laptop computer, a smart device, a smart phone, a mobile device, a handheld device, a tablet device, a virtual reality device, a portable computing device, or another computing device associated with a display. In an embodiment, the communication component 202 can obtain the statement data 112 based on audio data received by the computing device and/or generated by the computing device. For example, the communication component 202 can obtain the statement data 112 based on speech data (e.g., voice data), auditory data, video data, conversation data, and/or other non-textual data received by the computing device and/or generated by the computing device. In certain embodiment, the communication component 202 can obtain the statement data 112 based on audio data received by a recording device (e.g., a microphone) of the computing device. In another embodiment, the communication component 202 can obtain the statement data 112 based on textual data received by the computing device and/or generated by the computing device. For example, the communication component 202 can obtain the statement data 112 based on input data, typed data, message data, conversation data and/or other textual data received by the computing device and/or generated by the computing device. In certain embodiment, the communication component 202 can obtain the statement data 112 based on textual data received by a user interface (e.g., a graphical user interface) of the computing device.

In yet another embodiment, the communication component 202 can generate audio data associated with a response (e.g., an answer) related to the statement data 112. For example, the communication component 202 can generate speech data (e.g., voice data), auditory data, video data, conversation data, and/or other non-textual data associated with a response (e.g., an answer) related to the statement data 112. Additionally or alternatively, the communication component 202 can generate textual data associated with a response (e.g., an answer) related to the statement data 112. For example, the communication component 202 can generate output data, message data, conversation data and/or other textual data associated with a response (e.g., an answer) related to the statement data 112. In certain embodiments, the communication component 202 can facilitate presentation of at least a portion of the audio data and/or the textual data via a user interface (e.g., a graphical user interface) of the computing device associated with the statement data 112. Additionally or alternatively, the communication component 202 can facilitate presentation of at least a portion of the audio data and/or the textual data via an output device (e.g., a speaker) of the computing device associated with the statement data 112.

Additionally, it is to be appreciated that the system 200 can provide various advantages as compared to conventional dialogue system techniques. The system 200 can also provide various solutions to problems associated with conventional dialogue system techniques. For instance, performance for routing the statement data 112 to a corresponding skill of a dialogue system can be improved by employing the system 200. Furthermore, accuracy of data generated by a machine learning model associated with the dialogue routing data 114 can be improved. Moreover, quality of data generated by a machine learning model associated with the dialogue routing data 114 can be improved by employing the system 200.

Figure 3:
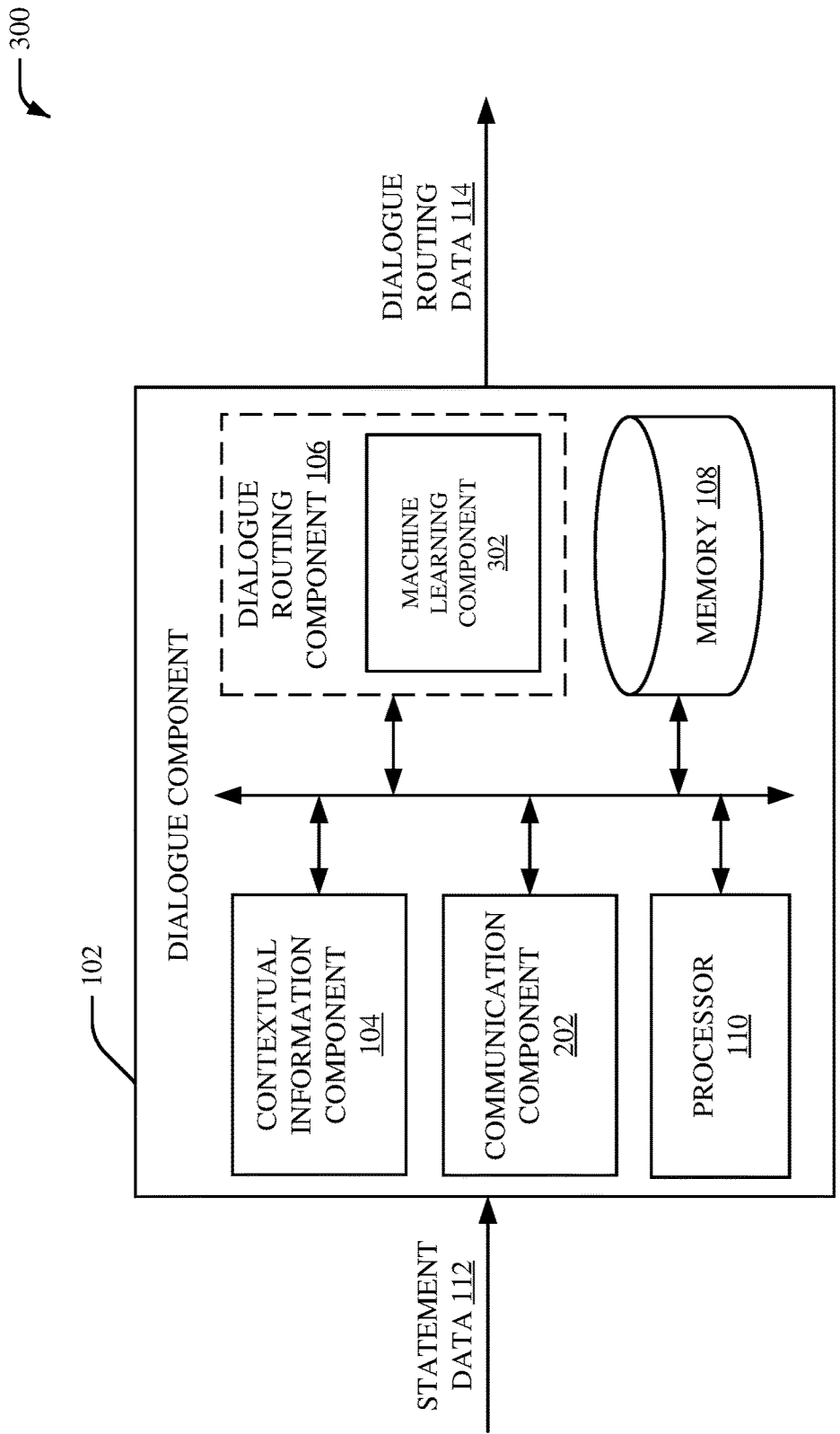
FIG. 3 illustrates a block diagram of yet another example, non-limiting system that includes a dialogue component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the contextual information component 104, the dialogue routing component 106, the communication component 202, the memory 108 and/or the processor 110. In the embodiment shown in FIG. 3, the dialogue routing component 106 can include a machine learning component 302. The machine learning component 302 can generate a model (e.g., a machine learning model) associated with the dialogue routing data 114. For example, the machine learning component 302 can generate a model (e.g., a machine learning model) to facilitate routing the statement data 112 to a skill of the dialogue system. In one example, the machine learning component 302 can generate a classification model to infer a correct skill for the statement data 112. In certain embodiments, the machine learning component 302 can generate a rule based model. For instance, the machine learning component 302 can generate a rule engine based on the contextual information. For example, the machine learning component 302 can generate a rule based model where:

$$g(x_{input}) = Prob(S_j | x_{input})$$

$$h(x_{context}) = \{h_i(e_i, v_i)\}$$

and $$h_i(e_i, v_i) = \{0,1\}^{|S|}$$

where |S| is the number of skills and $x_{input}$ corresponds to the statement data 112 and $x_{context}$ corresponds to the contextual information. $S_j$ can correspond to a jth skill, where j is an integer. Furthermore, $g(x_{input})$ can be a first function and $h(x_{context})$ can be a second function. Moreover, $$x_{input} = [w_1, w_2, \ldots, w_n] \text{ where } w_i: \text{ith word in user utterance}$$

$$x_{context} = \{(e_1, v_1), \ldots, (e_m, v_m)\} \text{ where } (e_i, v_i): \text{ith entity and intent in the system}$$

In an aspect, a function $f(x_{input}, x_{context})$ can be combined with the function $g(x_{input})$ and rules specified by the function $h(x_{context})$ as follows:

$$f(x_{input}, x_{context}) = \max_{S_j} \; g(x_{input}) \odot h_1(e_1, v_1) \odot \ldots \odot h_K(e_K, v_K)$$

where the probability for each skill is composed with the rule-based function $h_i$ given entity-value pairs extracted from user statement input. In certain embodiments, the machine learning component 302 can additionally or alternatively generate a predictive model. For instance, the machine learning component 302 can generate a predictive model by embedding the contextual information and the statement data 112. For example, the machine learning component 302 can combine a recurrent neural network model and a word embedding model to represent the statement data 112 and the contextual information in numerical vector. For example, the numerical model can be provided as follows:

$$f(x_{input}, x_{context}) = \arg\max_{S_j} \; Prob(S_j | x_{input}, x_{context})$$

The machine learning component 302 can employ machine learning and/or principles of artificial intelligence (e.g., one or more machine learning processes) to generate the dialogue routing data 114. The machine learning component 302 can perform learning explicitly or implicitly with respect to learning one or more patterns, one or more inferences, one or more correlations, one or more features and/or information related to the statement data 112 and/or the contextual data. In an aspect, the machine learning component 302 can learn one or more patterns, one or more inferences, one or more correlations, one or more features and/or information related to the statement data 112 and/or the contextual data based on classifications, correlations, inferences and/or expressions associated with principles of artificial intelligence. For instance, the machine learning component 302 can employ an automatic classification system and/or an automatic classification process to learn one or more patterns, one or more inferences, one or more correlations, one or more features and/or information related to the statement data 112 and/or the contextual data. In one example, the machine learning component 302 can employ a probabilistic and/or statistical-based analysis (e.g., factoring into the analysis utilities and costs) to learn and/or generate inferences with respect to the statement data 112 and/or the contextual data. In an aspect, the machine learning component 302 can include an inference component (not shown) that can further enhance automated aspects of the machine learning component 302 utilizing in part inference-based schemes to learn one or more patterns, one or more inferences, one or more correlations, one or more features and/or information related to the statement data 112 and/or the contextual data.

The machine learning component 302 can employ any suitable machine-learning based techniques, statistical-based techniques and/or probabilistic-based techniques. For example, the machine learning component 302 can employ deep learning, expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 302 can perform a set of machine learning computations associated with learning one or more patterns, one or more inferences, one or more correlations, one or more features and/or information related to the statement data 112 and/or the contextual data. For example, the machine learning component 302 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more patterns, one or more inferences, one or more correlations, one or more features and/or information related to the statement data 112 and/or the contextual data.

Additionally, it is to be appreciated that the system 300 can provide various advantages as compared to conventional dialogue system techniques. The system 300 can also provide various solutions to problems associated with conventional dialogue system techniques. For instance, performance for routing the statement data 112 to a corresponding skill of a dialogue system can be improved by employing the system 300. Furthermore, accuracy of data generated by a machine learning model associated with the dialogue routing data 114 can be improved. Moreover, quality of data generated by a machine learning model associated with the dialogue routing data 114 can be improved by employing the system 300.

Figure 4:
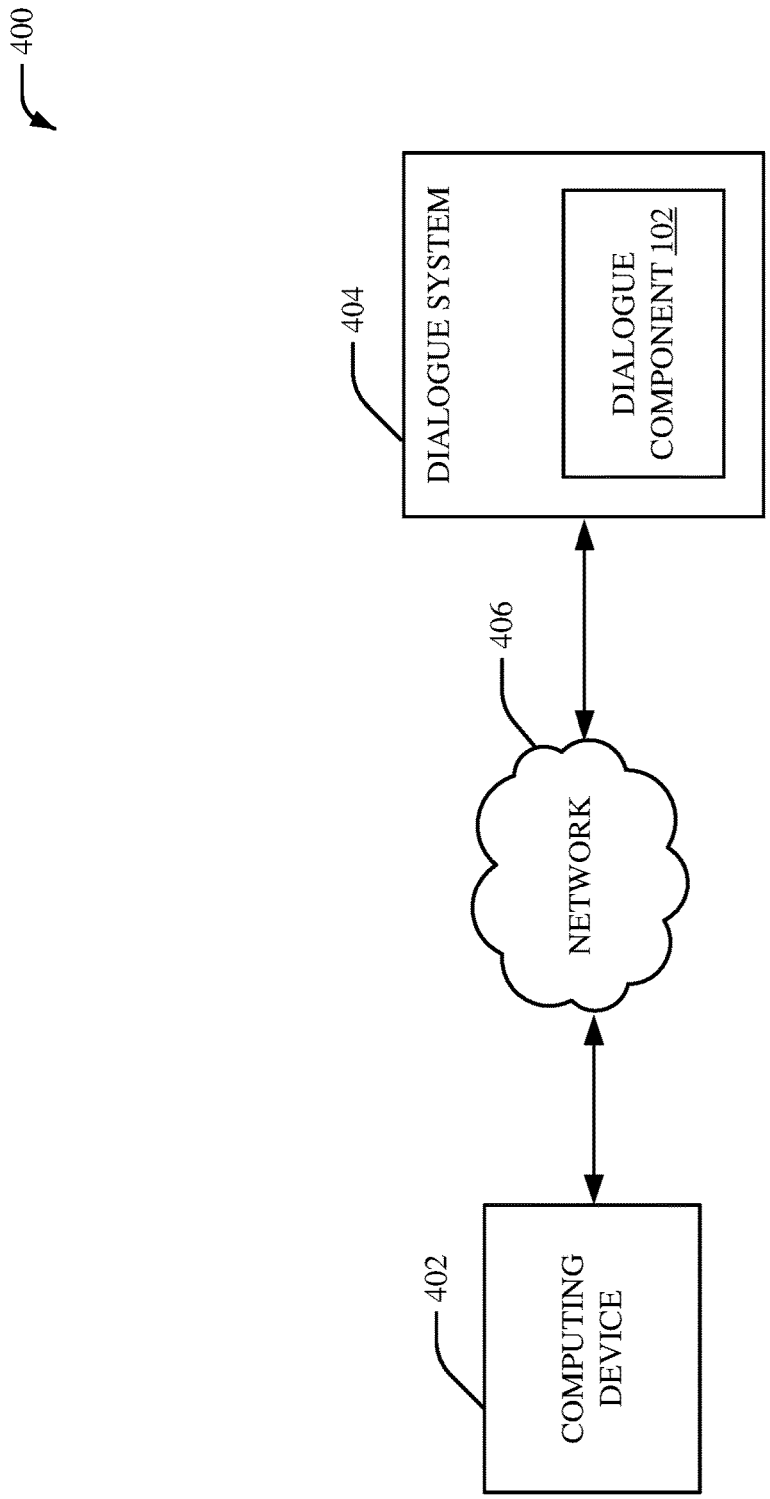
FIG. 4 illustrates an example, non-limiting system associated with a computing device and a dialogue system in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes a computing device 402 and a dialogue system 404. The dialogue system 404 can include the dialogue component 102. In an embodiment, the dialogue component 102 can include the contextual information component 104, the dialogue routing component 106, the communication component 202, the machine learning component 302, the memory 108 and/or the processor 110. In certain embodiments, the dialogue system 404 can be a server system. In certain embodiments, the dialogue system 404 can be implemented in a network computing environment (e.g., a cloud computing environment). The dialogue system 404 can be communicatively coupled to the computing device 402 via a network 406. The network 406 can be a communication network, a wireless network, a wired network, an internet protocol (IP) network, a voice over IP network, an internet telephony network, a mobile telecommunications network or another type of network. The computing device 402 can be configured to interact with a user (e.g., a user identity). For example, the computing device 402 can be configured to obtain the statement data 112. Additionally or alternatively, the computing device 402 can be configured to present a response (e.g., an answer) related to the statement data 112. The computing device 402 can be a user device, an electronic device, a display device, a desktop computer, a laptop computer, a smart device, a smart phone, a mobile device, a handheld device, a tablet device, a virtual reality device, a portable computing device, or another computing device associated with a display. In certain embodiments, the computing device 402 can transmit data (e.g., at least a portion of the statement data 112) to the dialogue system 404 via the network 306. For example, in certain embodiments, the computing device 402 can transmit data (e.g., at least a portion of the statement data 112) to the dialogue component 102 of the dialogue system 404 via the network 406. Additionally or alternatively, the computing device 402 can receive data (e.g., at least a portion of the response related to the statement data 112) from the dialogue system 404 via the network 406. For example, in certain embodiments, the computing device 402 can receive data (e.g., at least a portion of the response related to the statement data 112) from the dialogue component 102 of the dialogue system 404 via the network 406. In certain embodiments, the computing device 402 can be communicatively coupled to an application programming interface of the dialogue system 404.

Additionally, it is to be appreciated that the system 400 can provide various advantages as compared to conventional dialogue system techniques. The system 400 can also provide various solutions to problems associated with conventional dialogue system techniques. For instance, performance for routing the statement data 112 to a corresponding skill of the dialogue system 404 can be improved by employing the system 400. Furthermore, accuracy of data generated by a machine learning model associated with dialogue routing can be improved. Moreover, quality of data generated by a machine learning model associated with dialogue routing can be improved by employing the system 400.

Figure 5:
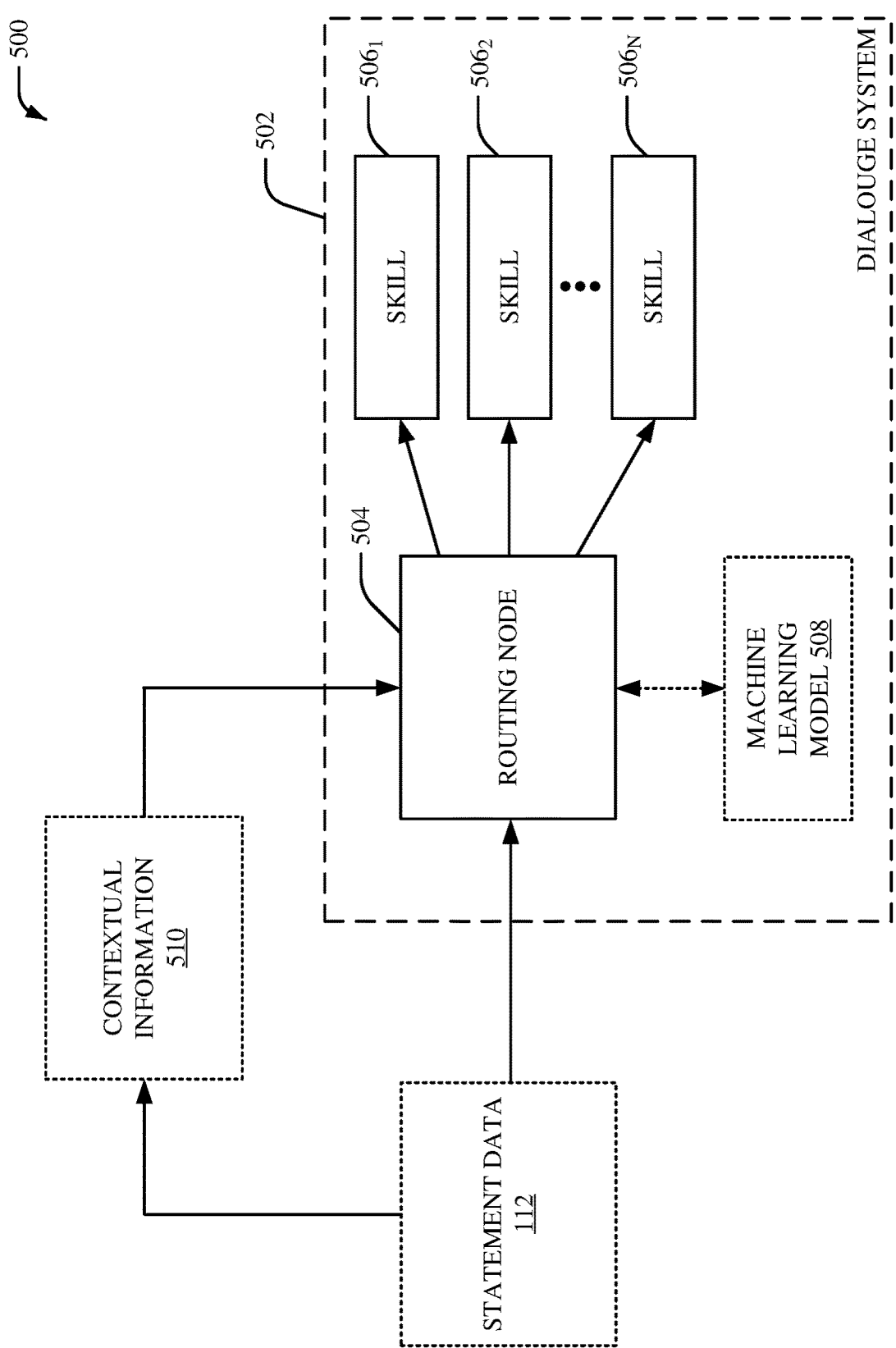
FIG. 5 illustrates an example, non-limiting system associated with a dialogue system in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a dialogue system 502. The dialogue system 502 can correspond to at least a portion of the dialogue system 404. The dialogue system 502 can include a routing node 504. The routing node 504 can route the statement data 112 to a skill from a set of skills $506_{1-N}$, where N is an integer. The set of skills $506_{1-N}$ can include, for example, two or more skills. In an aspect, the routing node 504 can be a routing node in a path traversal to the set of skills $506_{1-N}$. For example, the routing node 504 can be a routing node in a path along a dialogue skill route that includes multiple routing nodes to route the statement data 112 to a particular skill from the set of skills $506_{1-N}$. In an embodiment, the dialogue system 502 can employ a machine learning model 508 to facilitate routing the statement data 112 to a skill from a set of skills $506_{1-N}$ via the routing node 504. A skill from the set of skills $506_{1-N}$ can be, for example, a model (e.g., a machine learning model, a generative model, etc.) that generates a response (e.g., an answer) in response to the statement data 112. For instance, a skill from the set of skills $506_{1-N}$ can be a software program that represents a particular capability of a task and/or an answer in a specific domain. Furthermore, in an embodiment, a user associated with a computing device (e.g., the computing device 402) can interact with a skill from the set of skills $506_{1-N}$ to automate a task, make a decision and/or control a hardware device. In a non-limiting embodiment, the skill $506_1$ can provide a first skill associated with a digital concierge platform, the skill $506_2$ can provide a second skill associated with the digital concierge platform. In another non-limiting embodiment, the skill $506_1$ can provide a first skill associated with control of an electronic device, the skill $506_2$ can provide a second skill associated with control of the electronic device. In yet another non-limiting embodiment, the skill $506_1$ can provide a first skill associated with control of an internet of things device, the skill $506_2$ can provide a second skill associated with control of the internet of things device. In yet another non-limiting embodiment, the skill $506_1$ can provide a first skill associated with providing information (e.g., providing a weather forecast, etc.), the skill $506_2$ can provide a second skill associated with providing information (e.g., providing weather forecast, etc.). In an aspect, the skill $506_1$ can be a first model associated with a first skill that generates a first response to the statement data 112, the skill $506_2$ can be a second model associated with a second skill that generates a second response to the statement data 112, the skill $506_N$ can be an Nth model associated with an Nth skill that generates an Nth response to the statement data 112, etc.

The machine learning model 508 can be generated by the dialogue component 102, for example. In an embodiment, the machine learning model 508 can be a model included in the dialogue routing data 114. The machine learning model 508 can be, for example, a classification model to classify infer a skill from the set of skills $506_{1-N}$ for the statement data 112. In an embodiment, the dialogue component 102 can generate the machine learning model 508 based on the statement data 112 and the contextual information 510. In certain embodiments, the dialogue component 102 can additionally or alternatively generate the machine learning model 508 based on intent information associated with the statement data 112. The contextual information 510 can be data that provides context to the statement data 112. In an aspect, the contextual information 510 can provide knowledge regarding the statement data 112. In an embodiment, the contextual information component 104 can determine contextual information 510 based on the statement data 112. For instance, the contextual information 510 can include an entity, a feature, an event, a preference, a noun, a verb, a location, a name of a place, a date, a time, and/or other contextual information. In certain embodiments, the contextual information component 104 can determine the contextual information 510 via one or more NLP techniques and/or one or more NLU techniques. For example, the contextual information component 104 can employ a language model associated with NLP and/or a language model associated with NLP to extract the contextual information 510 from the statement data 112. Additionally or alternatively, the contextual information component 104 can determine the contextual information 510 based on non-textual data related to a user identity that provides the statement data 112. The non-textual data can include, for example, a user location associated with the user identity, a location associated with the computing device 402, a user profile associated with the user identity, historical data associated with the user identity and/or other non-textual data not included in the statement data 112. In an example, the contextual information component 104 can determine the contextual information 510 based on location data indicative of a location associated with a computing device 402. Additionally or alternatively, the contextual information component 104 can determine the contextual information 510 based on user profile data stored in the computing device 402. In an aspect, the contextual information 510 can be dynamic data. Furthermore, the contextual information 510 can include session context associated with a dialogue session, built-in shared context associated with contextual information available to two or more skills in the set of skills $506_{1-N}$, skill context associated with a conversation within a particular skill from the set of skills $506_{1-N}$, and/or utterance context associated with information regarding a user identity and/or a computing device (e.g., the computing device 402) during capture of the statement data 112. In an embodiment, the dialogue system 502 can include the dialogue component 102. In another embodiment, the dialogue system 502 can be communicatively coupled to the dialogue component 102. As such, the dialogue system 502 can dialogue system can provide multiple skills by employing the statement data 112 (e.g., user utterance) as well as the contextual information 510.

Additionally, it is to be appreciated that the system 500 can provide various advantages as compared to conventional dialogue system techniques. The system 500 can also provide various solutions to problems associated with conventional dialogue system techniques. For instance, performance for routing the statement data 112 to a corresponding skill from the set of skills $506_{1-N}$ of the dialogue system 502 can be improved by employing the system 500. Furthermore, accuracy of data generated by a machine learning model associated with dialogue routing can be improved. Moreover, quality of data generated by a machine learning model associated with dialogue routing can be improved by employing the system 500.

Figure 6:
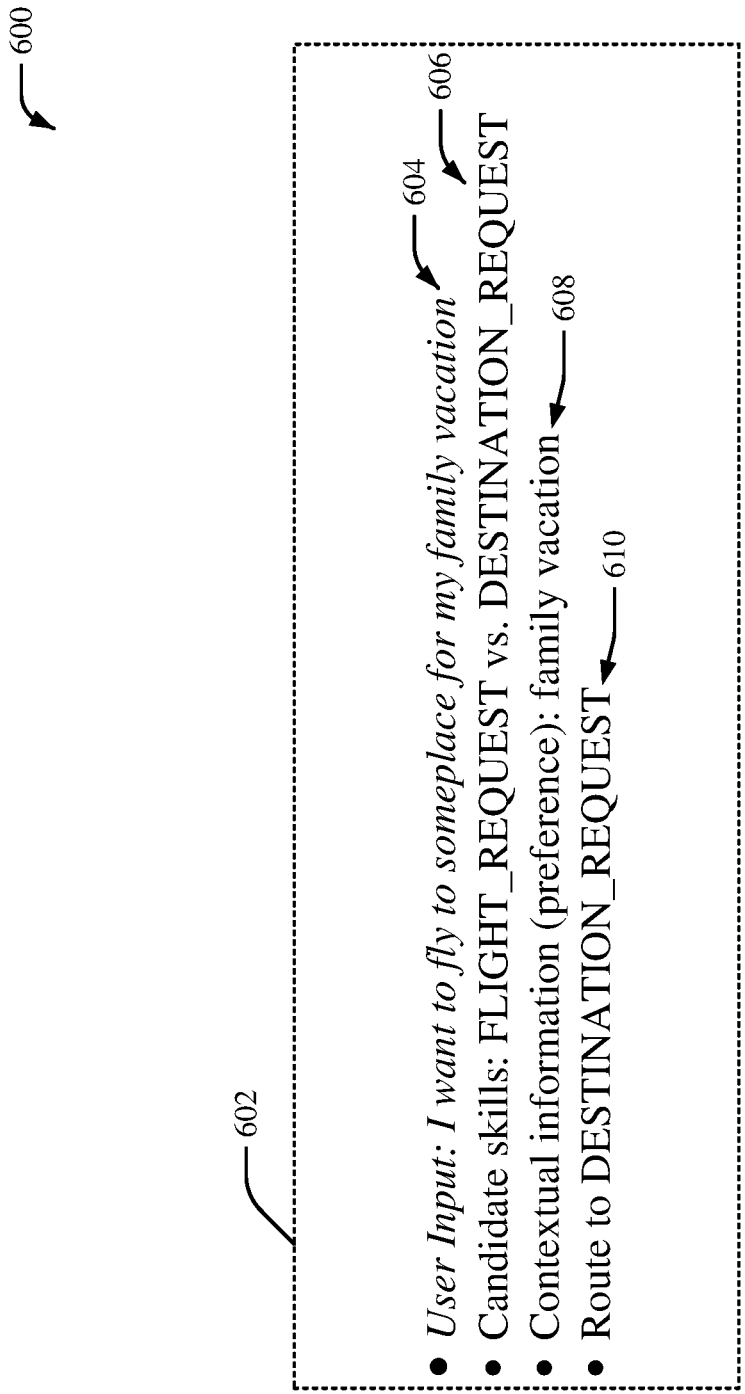
FIG. 6 illustrates an example, non-limiting system associated with a dialogue routing process in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes an example dialogue routing process 602. The dialogue routing process 602 includes a step 604 where user input is provided. For example, the user input at the step 604 can correspond to the statement data 112. Furthermore, the user input at the step 604 can include a phrase such as, for example, "I want to fly to someplace for my family vacation." The dialogue routing process 602 also includes a step 606 where candidate skills are determined. For instance, the candidate skills at the step 606 can include two or more skills from the set of skills $506_{1-N}$ to potentially route the user input (e.g., the statement data 112). In an example, the candidate skills at the step 606 can include a first skill "FLIGHT_REQUEST" and a second skill "DESTINATION_REQUEST." Furthermore, the dialogue routing process 602 also includes a step 608 where contextual information is determined. For example, the contextual information determined at the step 608 can correspond to "family vacation." In an embodiment, the contextual information at the step 608 can be determined based on a preference (e.g., a user preference). The dialogue routing process 602 also includes a step 610 where the user input (e.g., the statement data 112) is routed to a particular skill from the candidate skill determined at the step 606. For example, at the step 610, the user input (e.g., the statement data 112) can be routed to the second skill "DESTINATION_REQUEST."

Figure 7:
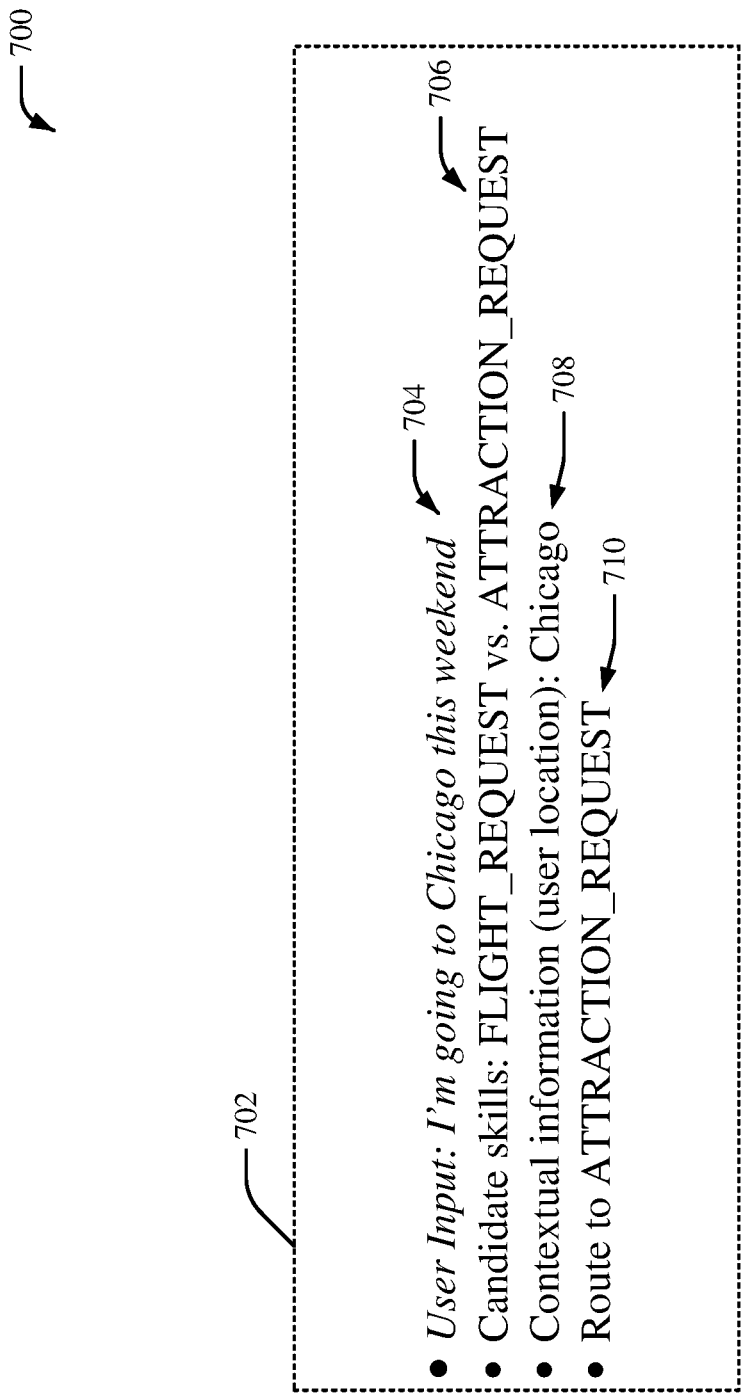
FIG. 7 illustrates another example, non-limiting system associated with a dialogue routing process in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes an example dialogue routing process 702. The dialogue routing process 702 includes a step 704 where user input is provided. For example, the user input at the step 704 can correspond to the statement data 112. Furthermore, the user input at the step 704 can include a phrase such as, for example, "I'm going to Chicago this weekend." The dialogue routing process 702 also includes a step 706 where candidate skills are determined. For instance, the candidate skills at the step 706 can include two or more skills from the set of skills $506_{1-N}$ to potentially route the user input (e.g., the statement data 112). In an example, the candidate skills at the step 706 can include a first skill "FLIGHT_REQUEST" and a second skill "ATTRACTION_REQUEST." Furthermore, the dialogue routing process 702 also includes a step 708 where contextual information is determined. For example, the contextual information determined at the step 708 can correspond to "Chicago." In an embodiment, the contextual information at the step 708 can be determined based on a user location. The dialogue routing process 702 also includes a step 710 where the user input (e.g., the statement data 112) is routed to a particular skill from the candidate skill determined at the step 706. For example, at the step 710, the user input (e.g., the statement data 112) can be routed to the second skill "ATTRACTION_REQUEST."

Figure 8:
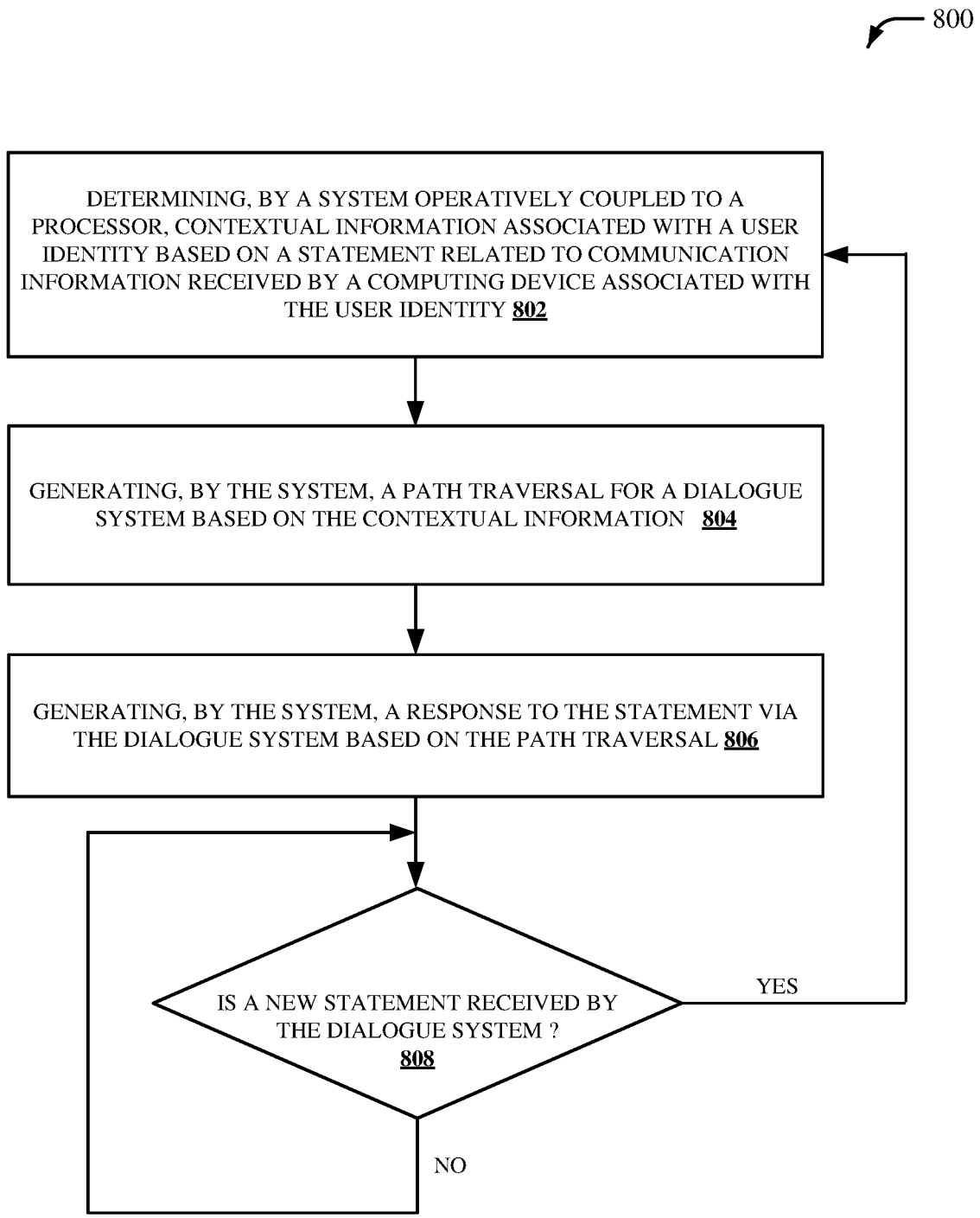
FIG. 8 illustrates a flow diagram of an example, non-limiting computer-implemented method for facilitating a dialogue system based on contextual information in accordance with one or more embodiments described herein.

FIG. 8 illustrates a flow diagram of an example, non-limiting computer-implemented method 800 that facilitates a dialogue system based on contextual information in accordance with one or more embodiments described herein. Repetitive description of like elements employed in other embodiments described herein is omitted for sake of brevity.

At 802, contextual information associated with a user identity is determined, by a system operatively coupled to a processor (e.g., by the contextual information component 104), based on a statement related to communication information received by a computing device associated with the user identity. The contextual information can be data that provides context to the statement. In an aspect, the contextual information can provide knowledge regarding the statement. In an embodiment, the contextual information can be determined based on the statement. For instance, the contextual information can include an entity, a feature, an event, a preference, a noun, a verb, a location, a name of a place, a date, a time, and/or other contextual information. In certain embodiments, the contextual information can be determined via one or more NLP techniques and/or one or more NLU techniques. For example, a language model associated with NLP and/or a language model associated with NLP can be employed to extract the contextual information from the statement. Additionally or alternatively, the contextual information can be determined based on non-textual data related to a user identity that provides the statement. The non-textual data can include, for example, a user location associated with the user identity, a location associated with the computing device, a user profile associated with the user identity, historical data associated with the user identity and/or other non-textual data not included in the statement. In an example, the contextual information can be determined based on location data indicative of a location associated with a computing device. Additionally or alternatively, the contextual information can be determined based on user profile data stored in the computing device. In an aspect, the contextual information can be dynamic data. Furthermore, the contextual information can include session context associated with a dialogue session, built-in shared context associated with contextual information available to two or more skills, skill context associated with a conversation within a particular skill, and/or utterance context associated with information regarding a user identity and/or a computing device during capture of the statement.

At 804, a path traversal for a dialogue system is generated, by the system (e.g., by the dialogue routing component 106), based on the contextual information. Additionally or alternatively, the path traversal for the dialogue system can be generated based on statement input provided to the dialogue system. The dialogue system can be a human-computer dialogue system, a human-computer dialogue management system, a conversational computing system, a chatbox system, a digital assistant system, a digital concierge system, and/or another type of dialogue system to facilitate a human-computer interaction (e.g., a human-computer conversation). The path traversal can be a path along a dialogue skill route to route the statement to a skill associated with the dialogue system. For example, the statement can be directed along the path to provide an optimal path traversal to a skill associated with the dialogue system. A skill associated with the dialogue system can be, for example, a model (e.g., a machine learning model, a generative model, etc.) that generates a response (e.g., an answer) in response to the statement. In certain embodiments, the path traversal for the dialogue system can be additionally generated based on intent information. The intent information can be indicative of one or more intents associated with the statement. For instance, the intent information can be indicative of a classification for one or more intents in the statement.

At 806, a response to the statement via the dialogue system is generated, by the system (e.g., by the communication component 202), based on the path traversal. The response can be an answer related to the statement. Furthermore, the response can include audio data and/or textual data. In an embodiment, the skill (e.g., the skill associated with the path traversal for the dialogue system) that receives the statement can generate the response. For example, the response can be output generated by the model associated with the skill.

At 808, it is determined whether a new statement is received by the dialogue system. If yes, the computer-implemented method 800 returns to 802. If not, the computer-implemented method 800 returns to 808 to monitor for a new statement received by the dialogue system. In certain embodiments, the computer-implemented method 800 can additionally or alternatively include generating, by the system (e.g., by the dialogue routing component 106), a machine learning model associated with the path traversal for the dialogue system based on the contextual information. In certain embodiments, the computer-implemented method 800 can additionally or alternatively include routing, by the system (e.g., by the dialogue routing component 106), information associated with the statement to a skill for the dialogue system based on the contextual information. In certain embodiments, the computer-implemented method 800 can additionally or alternatively include obtaining, by the system (e.g., by the communication component 202), the statement based on audio data received by the computing device. In certain embodiments, the computer-implemented method 800 can additionally or alternatively include obtaining, by the system (e.g., by the communication component 202), the statement based on textual data received by the computing device. In certain embodiments, the generating the path traversal comprises improving performance of the dialogue system.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining contextual information, generating a path traversal, generating a response to a statement via a dialogue system, etc. are established from a combination of electrical and mechanical components and circuitry, a human is unable to replicate or perform processing performed, for example, by the dialogue component 102 (e.g., the contextual information component 104, the dialogue routing component 106, the communication component 202, and/or the machine learning component 302) disclosed herein. For example, a human is unable determine contextual information using NLP and/or NLU, generate a path traversal using machine learning, generate a response to a statement via a dialogue system, etc.

Figure 9:
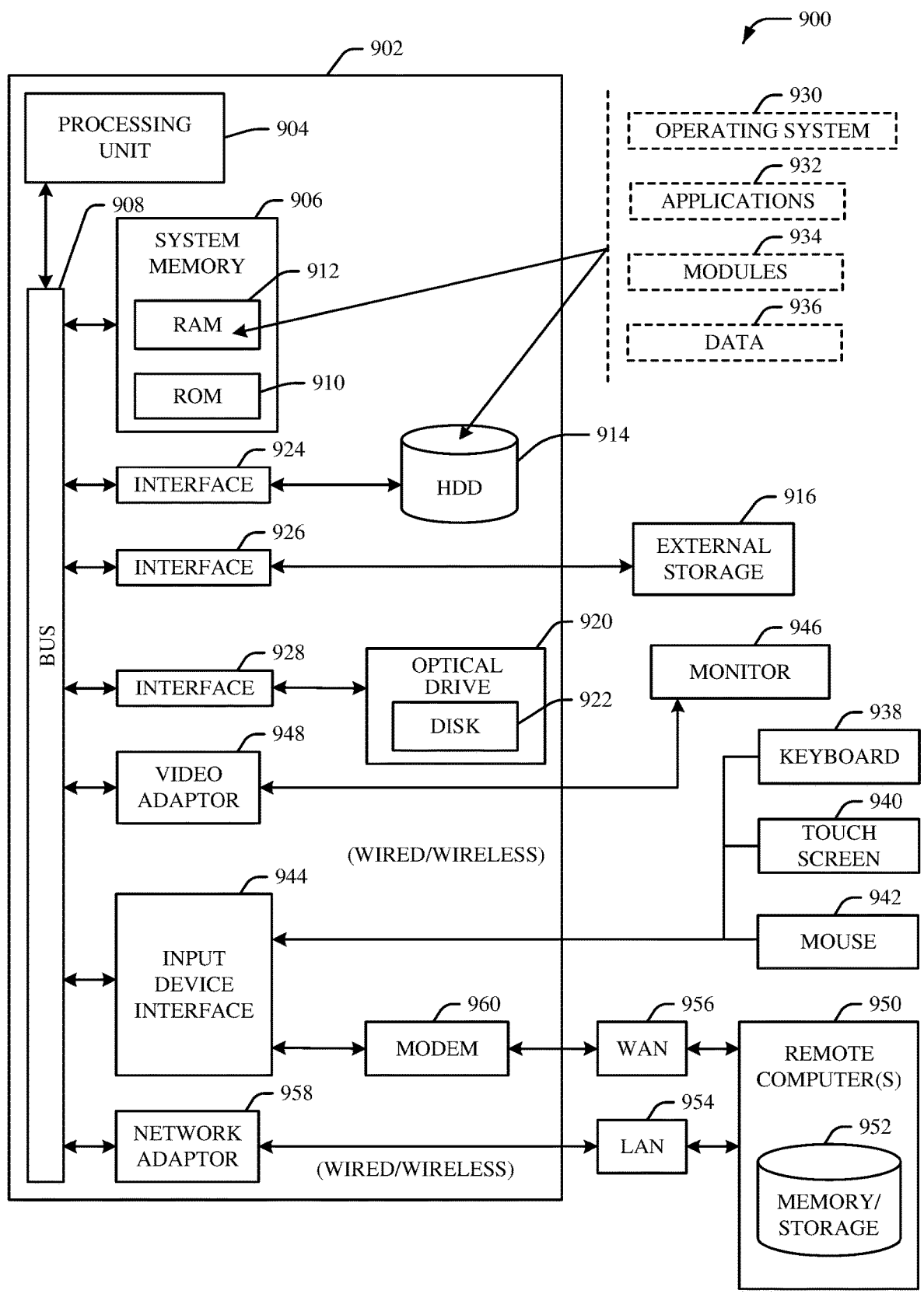
FIG. 9 illustrates a block diagram of an example, non-limiting operating environment in which one or more embodiments described herein can be facilitated.

In order to provide additional context for various embodiments described herein, FIG. 9 and the following discussion are intended to provide a general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
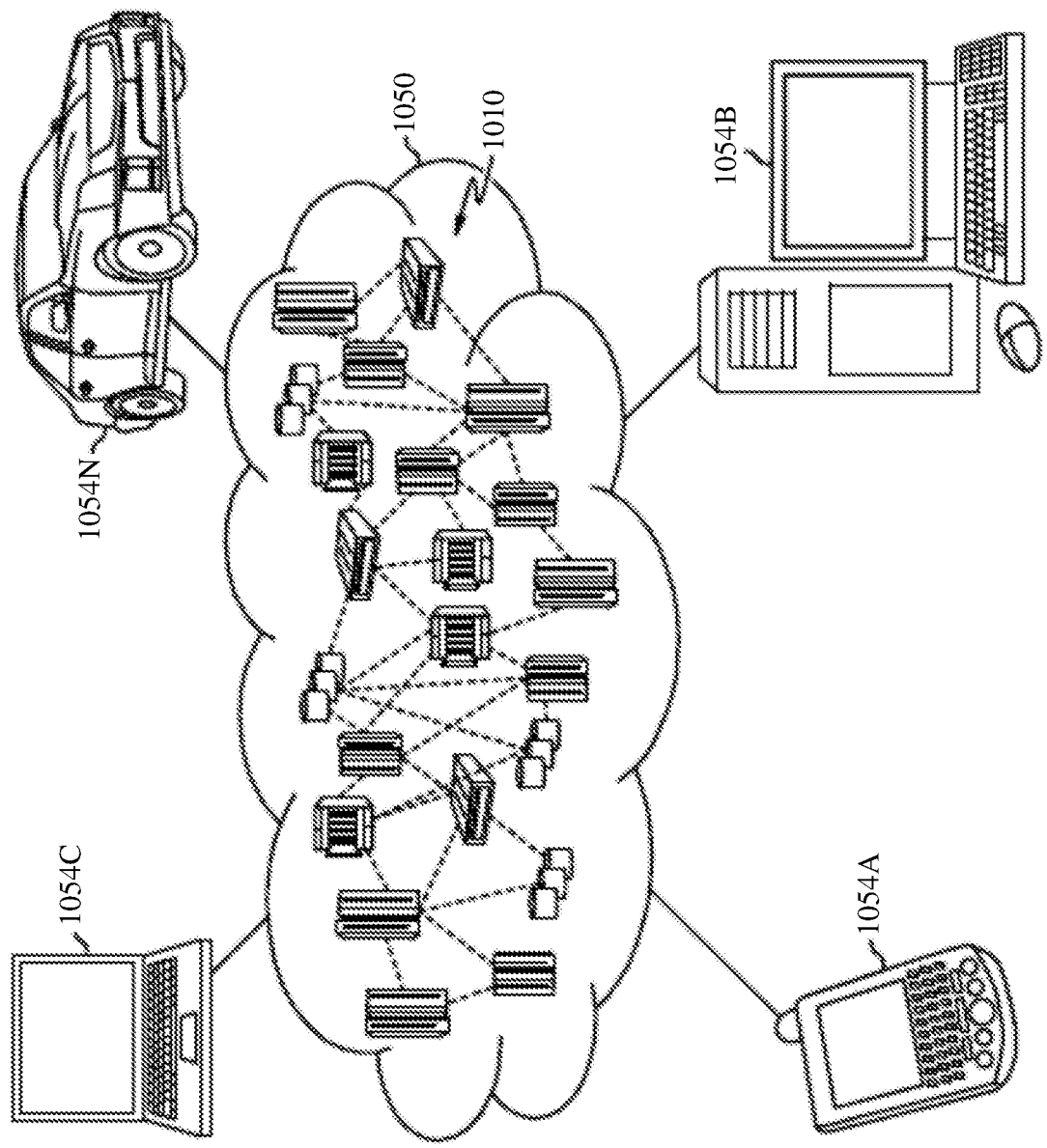
FIG. 10 illustrates a block diagram of an example, non-limiting cloud computing environment in accordance with one or more embodiments of the present invention.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
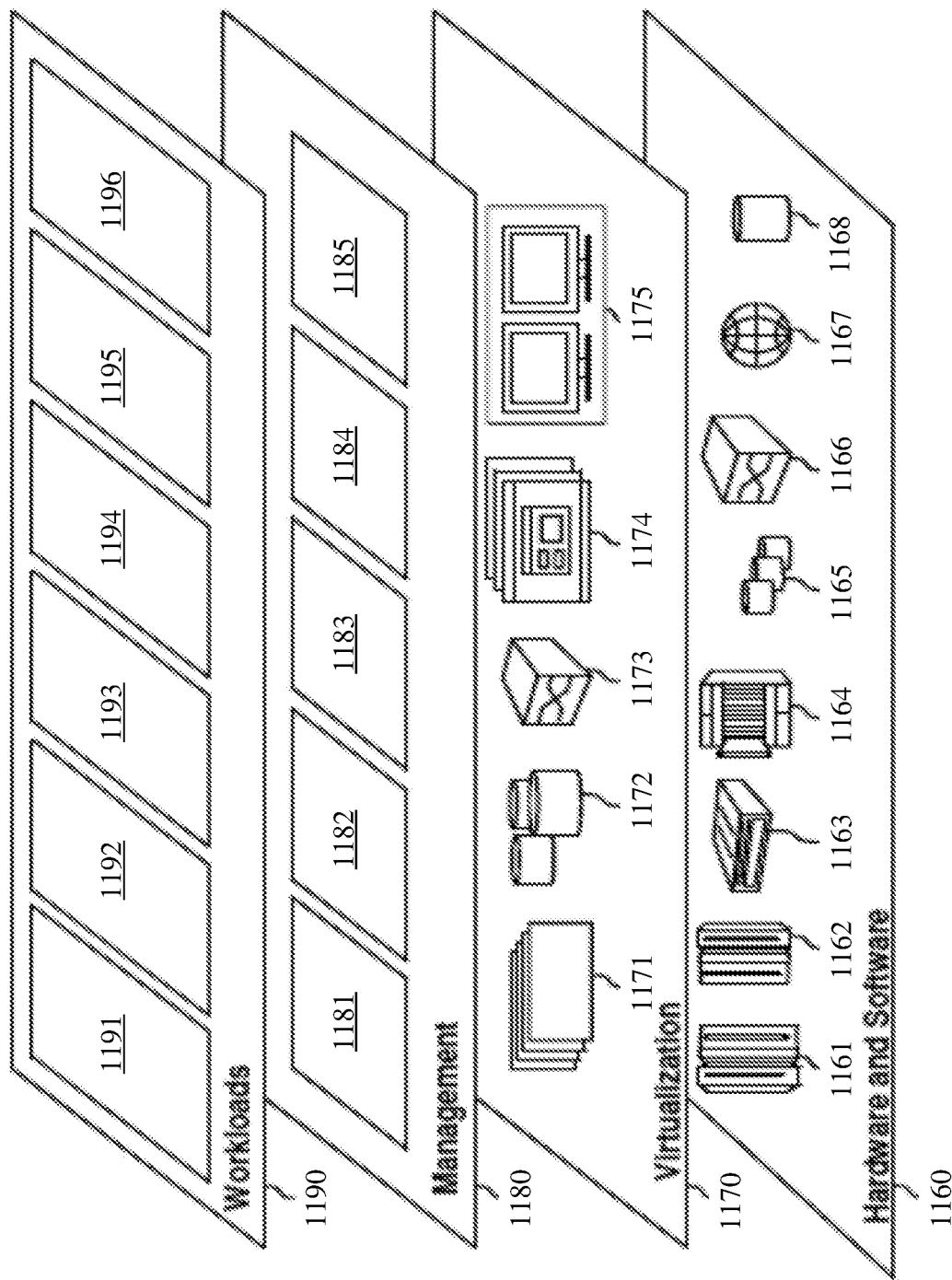
FIG. 11 illustrates a block diagram of example, non-limiting abstraction model layers in accordance with one or more embodiments of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Non-limiting examples of workloads and functions which may be provided from this layer include: mapping and navigation 1191; software development and lifecycle management 1192; virtual classroom education delivery 1193; data analytics processing 1194; transaction processing 1195; and dialogue system software 1196.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
a memory that stores computer executable components; and
a processor that executes the computer executable components stored in the memory, wherein the computer executable components comprise:
a contextual information component that determines contextual information associated with a user identity based on a statement related to communication information received by a computing device associated with the user identity; and
a dialogue routing component that generates a path traversal for a dialogue system based on the contextual information to facilitate generation of a response to the statement by the dialogue system, wherein the path traversal comprises a path along a dialogue skill route that routes statement data associated with the statement to a selected skill of a plurality of skills, wherein the selected skill is associated with the dialogue system, wherein the dialogue routing component routes based on a machine learning model information associated with the statement to the selected skill for the dialogue system based on the contextual information, and wherein the machine learning model generates a rule based model that is a function of a number of skills, the probability of a skill of the skills and the statement data.

2. The system of claim 1, wherein the dialogue routing component generates the machine learning model associated with the path traversal for the dialogue system based on the contextual information.

3. The system of claim 2, wherein the selected skill comprises a software program that represents a particular capability of a task or answer in a specific domain associated with the statement data.

4. The system of claim 1, wherein the contextual information component determines intent information based on the statement.

5. The system of claim 4, wherein the dialogue routing component generates the path traversal for the dialogue system based on the contextual information and the intent information.

6. The system of claim 1, wherein the contextual information component determines the contextual information based on location data indicative of a location associated with the computing device.

7. The system of claim 1, wherein the contextual information component determines the contextual information based on user profile data stored in the computing device.

8. The system of claim 1, wherein the contextual information component determines a first classification for the statement and a second classification for the contextual information.

9. The system of claim 1, the computer executable components further comprise:
a communication component that obtains the statement based on audio data received by the computing device.

10. The system of claim 1, the computer executable components further comprise:
a communication component that obtains the statement based on textual data received by the computing device.

11. The system of claim 1, wherein the dialogue routing component generates the path traversal for the dialogue system to improve performance of the dialogue system.

12. A computer-implemented method, comprising:
determining, by a system operatively coupled to a processor, contextual information associated with a user identity based on a statement related to communication information received by a computing device associated with the user identity;
generating, by the system, a path traversal for a dialogue system based on the contextual information to facilitate generation of a response to the statement by the dialogue system, wherein the path traversal comprises a path along a dialogue skill route that routes statement data associated with the statement to a selected skill of a plurality of skills, wherein the selected skill is associated with the dialogue system;
generating, by the system, a machine learning model associated with the path traversal for the dialogue system based on the contextual information, and wherein the machine learning model generates a rule based model that is a function of a number of skills, the probability of a skill of the skills and the statement data; and
routing, by the system, based on the machine learning model, information associated with the statement to the selected skill for the dialogue system based on the contextual information.

13. The computer-implemented method of claim 12, further comprising:
obtaining, by the system, the statement based on audio data received by the computing device or textual data received by the computing device.

14. The computer-implemented method of claim 12, wherein the generating the path traversal comprises improving performance of the dialogue system.

15. A computer program product for improving a dialogue system, the computer program product comprising a computer readable storage medium having program instructions embodied therewith, the program instructions executable by a processor to cause the processor to:
determine, by the processor, contextual information associated with a user identity based on a statement related to communication information received by a computing device associated with the user identity;
generate, by the processor, a path traversal for the dialogue system based on the contextual information to facilitate generation of a response to the statement by the dialogue system, wherein the path traversal comprises a path along a dialogue skill route that routes statement data associated with the statement to a selected skill of a plurality of skills, wherein the selected skill is associated with the dialogue system, and wherein the machine learning model generates a rule based model that is a function of a number of skills, the probability of a skill of the skills and the statement data; and
route, by the processor, based on the machine learning model, information associated with the statement to the selected skill for the dialogue system based on the contextual information.

16. The computer program product of claim 15, wherein the program instructions are further executable by the processor to cause the processor to:
generate, by the processor, the machine learning model associated with the path traversal for the dialogue system based on the contextual information.

17. The computer program product of claim 15, wherein the program instructions are further executable by the processor to cause the processor to:
obtain, by the processor, the statement based on audio data received by the computing device or textual data received by the computing device.

* * * * *